United States Patent
Gluska et al.

(10) Patent No.: US 9,972,062 B2
(45) Date of Patent: *May 15, 2018

(54) PARALLEL FLOOD-FILL TECHNIQUES AND ARCHITECTURE

(71) Applicant: INTEL CORPORATION, Santa Clara, CA (US)

(72) Inventors: Alon Gluska, Adi (IL); Niraj Gupta, Bangalore (IN); Mostafa Hagog, Kaukab (IL); Dror Reif, Be'er-Yacoov (IL)

(73) Assignee: INTEL CORPORATION, Santa Clara, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/550,214

(22) Filed: Nov. 21, 2014

(65) Prior Publication Data

US 2015/0077422 A1 Mar. 19, 2015

Related U.S. Application Data

(63) Continuation of application No. 13/651,854, filed on Oct. 15, 2012, now Pat. No. 8,902,238.

(51) Int. Cl.
*G06F 15/80* (2006.01)
*G09G 5/02* (2006.01)
*G06T 1/20* (2006.01)

(52) U.S. Cl.
CPC ........................ *G06T 1/20* (2013.01)

(58) Field of Classification Search
CPC ....... G06T 1/20; G06T 2210/52; G09G 5/363; G09G 5/02

(Continued)

(56) References Cited

U.S. PATENT DOCUMENTS

| 7,414,635 B1 * | 8/2008 | Fowler | G06T 15/30 |
| | | | 345/620 |
| 7,830,387 B2 * | 11/2010 | Pronovost | G06F 3/14 |
| | | | 345/501 |

(Continued)

OTHER PUBLICATIONS

"Flood Fill." Wikipedia entry. Retrieved from: http://en.wikipedia.org/wiki/Flood_fill on Aug. 22, 2012, last modified on Aug. 12, 2012 at 08:35, 7 pages.

*Primary Examiner* — Jacinta M Crawford
(74) *Attorney, Agent, or Firm* — Finch & Maloney PLLC

(57) ABSTRACT

Flood-fill techniques and architecture are disclosed. In accordance with one embodiment, the architecture comprises a hardware primitive with a software interface which collectively allow for both data-based and task-based parallelism in executing a flood-fill process. The hardware primitive is defined to do the flood-fill function and is scalable and may be implemented with a bitwise definition that can be tuned to meet power/performance targets, in some embodiments. In executing a flood-fill operation, and in accordance with an example embodiment, the software interface produces parallel threads and issues them to processing elements, such that each of the threads can run independently until done. Each processing element in turn accesses a flood-fill hardware primitive, each of which is configured to flood a seed inside an N×M image block. In some cases, processing element commands to the flood-fill hardware primitive(s) can be queued and acted upon pursuant to an arbitration scheme.

19 Claims, 7 Drawing Sheets

(58) Field of Classification Search
USPC .................................... 345/501, 505, 589
See application file for complete search history.

(56) References Cited

U.S. PATENT DOCUMENTS

| | | | | |
|---|---|---|---|---|
| 8,549,500 | B2* | 10/2013 | Stefansson | G06F 9/5072 717/148 |
| 8,649,567 | B1* | 2/2014 | Maltby, II | G06T 17/05 382/106 |
| 8,744,184 | B2* | 6/2014 | Ameline | G06T 11/40 382/173 |
| 2006/0087518 | A1 | 4/2006 | Ameline et al. | |
| 2008/0122858 | A1* | 5/2008 | Wilensky | G06T 15/503 345/592 |
| 2009/0033670 | A1* | 2/2009 | Hochmuth | G06F 3/1454 345/545 |
| 2009/0122071 | A1 | 5/2009 | Ameline et al. | |
| 2009/0122072 | A1 | 5/2009 | Ameline et al. | |
| 2009/0122077 | A1 | 5/2009 | Ameline et al. | |
| 2009/0122078 | A1 | 5/2009 | Ameline et al. | |
| 2009/0309884 | A1* | 12/2009 | Lippincott | G06F 9/3879 345/502 |
| 2011/0202745 | A1* | 8/2011 | Bordawekar | G06T 1/20 712/30 |
| 2014/0104285 | A1 | 4/2014 | Gluska et al. | |

* cited by examiner

| B21 | C21 | |
|---|---|---|
| B22 | C22= C22 OR ((B21 OR B22 OR B23) AND Valid_C22)) | |
| B23 | | |

Fig. 3a

| B21 | C21 | D21 |
|---|---|---|
| B22 | C22=C22 OR ((B21 OR C21 OR D21) AND Valid_C22)) | D22 |

Fig. 3b

| | | D21 |
|---|---|---|
| | C22=OR(C22,AND(OR(D21\|D22\|D23),Valid_C22)) | D22 |
| | | D23 |

Fig. 3c

| | C22=OR(C22,AND(OR(B23\|C23\|D23),Valid_C22)) | |
|---|---|---|
| B23 | C23 | D23 |

Fig. 3d

|   |   |   |   |   |   |   |   |   |
|---|---|---|---|---|---|---|---|---|
|   |   |   |   |   |   |   |   |   |
|   |   |   |   | 4 |   |   |   |   |
|   |   |   | 4 | 3 | 4 |   |   |   |
|   |   | 4 | 3 | 2 | 3 | 4 |   |   |
|   | 4 | 3 | 2 | 1 | 2 | 3 | 4 |   |
|   |   | 4 | 3 | 2 | 3 | 4 |   |   |
|   |   |   | 4 | 3 | 4 |   |   |   |
|   |   |   |   | 4 |   |   |   |   |
|   |   |   |   |   |   |   |   |   |

Fig. 4

PARALLEL FLOOD-FILL TECHNIQUES AND ARCHITECTURE

RELATED APPLICATION

This application is a continuation of U.S. application Ser. No. 13/651,854 filed Oct. 15, 2012, which is herein incorporated by reference in its entirety.

BACKGROUND

Flood-fill is a standard operation in media, and can be performed on a given image. A typical flood-fill algorithm takes three parameters: a start node also known as a seed node, a target value, and a replacement value. The algorithm looks for all nodes in the image which are connected to the start node by a path of the target value, and changes them to the replacement value. The most known use of the algorithm is to color an entire area of connected pixels with the same color used in numerous painting programs. In such cases, the target and replacement values represent specific colors. There are many published ways in which the flood-fill algorithm can be implemented.

BRIEF DESCRIPTION OF THE DRAWINGS

FIGS. 3a-d collectively demonstrate example logic implemented by a hardware primitive of the system shown in FIG. 1 so as to flood-fill a desired seed node in four passes using an 8-connected flood-fill scheme, in accordance with an embodiment of the present invention.

FIG. 4 illustrates wave propagation of a plurality of numbered M×N flood-fill image blocks, wherein processing of image blocks of the same stage can be performed in parallel, in accordance with an embodiment of the present invention.

DETAILED DESCRIPTION

Figure 1:
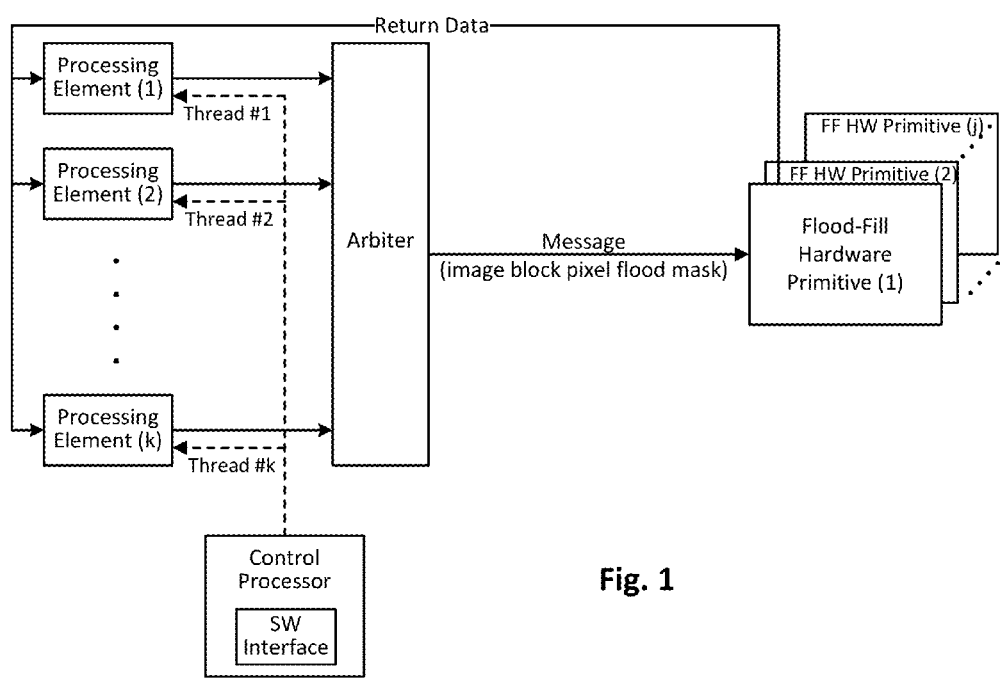
FIG. 1 is a block diagram illustrating a flood-fill system configured in accordance with an embodiment of the present invention.

Flood-fill techniques and architecture are disclosed. In accordance with one embodiment, the architecture comprises a hardware primitive with a software interface which collectively allow for both data-based and task-based parallelism in executing a flood-fill process. The hardware primitive is defined to perform the flood-fill function and is scalable and may be implemented with a bitwise definition that can be tuned to meet power/performance targets, in some embodiments. In executing a flood-fill operation, and in accordance with an example embodiment, the software interface produces parallel threads and issues them to processing elements, such that each of the threads can run independently until done. Each processing element in turn accesses a flood-fill hardware primitive, each of which is configured to flood a seed node inside an N×M image block. In some cases, processing element commands to the flood-fill hardware primitive(s) can be queued and acted upon pursuant to an arbitration scheme.

General Overview

As previously explained, there are many published ways in which the flood-fill algorithm can be implemented. However, typical flood-fill algorithms tend to be serial in nature. Such algorithms start with a specific seed and flood its values to its neighbors in an iterative manner. In addition, such algorithms fail to accommodate or otherwise deal with the concurrent flood of multiple seeds on parallel computing. In addition, parallel flood-fill techniques tend to be avoided or otherwise not well understood given factors such as computational complexity or alternative processing techniques. Moreover, conventional flood-fill techniques are not power/performance optimized for highly parallel hardware or otherwise fail to effectively address power/performance efficiency. In a more general sense, conventional flood-fill techniques fail to efficiently exploit hardware parallel execution capabilities to expedite the flood-fill operation.

Thus, and in accordance with an embodiment of the present invention, a methodology is provided for acceleration of the flood-fill operation. One such embodiment combines a hardware primitive stage with a software interface that enables the concurrent execution of the flood-fill on multiple image blocks. In addition to utilizing multiple hardware primitives for achieving improved throughput, some such embodiments of the present invention also significantly improve the power/performance efficiency of the flood-fill operation, by enabling the implementation of a dedicated bitwise flood-fill operation which is efficient in area and power and amount of cycles (performance). In some embodiments, one or some of the hardware primitives can be replaced by software in a processing unit if, for example, those particular hardware primitives cannot be implemented in some of the system architecture. As will be appreciated in light of this disclosure, the parallel flood-fill techniques provided herein can be used to facilitate a scalable hardware implementation using the software interface, in accordance with an embodiment.

In operation, the parallel flood-fill method can be used, for example, to enable parallel implementation of the flood-fill algorithm when called from parallel threads, in accordance with an embodiment. In one such example case, two flood-fill problems can utilize the parallel processing capability: the first flood-fill problem can be a multiple seed flood-fill, or a single seed flood-fill; in the second, later flood-fill problem the parallel threads can work in non-overlapping blocks. Each hardware primitive can be configured, for example, to perform flood-fill on a pre-defined rectangular image block or other polygonal shaped image block to be filled. The software interface defines the input, output and functionality of the flood-fill operation, such that the software can use it repeatedly in order to perform the flood-fill on the whole image (or on a selected portion or portions of the image). The repeated activation can be done on single or multiple seeds and by multiple threads in parallel, as will be further appreciated in light of this disclosure.

The techniques and architecture provided herein can be implemented in any number of applications involving, for example, media operations that may benefit from parallel logic and/or a hardware block specifically defined to execute the flood-fill function. Likewise, the techniques and architecture provided herein can be implemented in applications involving, for instance, video analytics, perceptual computing workloads, and image processing in the mobile computing devices (e.g., cell phones, smartphones, and tablets) due to power/performance advantages provided herein. Numerous other benefits and applications will be apparent in light of this disclosure.

System Architecture

FIG. 1 illustrates a block diagram of a flood-fill system showing the flow of a parallel flood-fill using one or more flood-fill hardware primitives (FF HW Primitives 1 through j) and a software interface (SW Interface) to one or more processing elements (1-k), in accordance with an embodiment of the present invention. As can be further seen in this example, the software interface executes on a control processor, and each processing element is programmed or otherwise configured to execute a flood-fill algorithm capable of accessing the hardware primitives. An optional arbiter can be used to communicatively couple the processing elements with the flood-fill hardware primitives. The software interface is programmed or otherwise configured to produce parallel threads and issue them to the processing elements, such that each of the threads can run independently until done. Each processing element in turn accesses a flood-fill hardware primitive, each of which is configured to flood a seed inside an N×M image block. The flood-fill hardware primitives can be configured to work with any flooding algorithm that generates an input pixel flood map, which is sent to a given hardware primitive to generate or otherwise define the final pixel positions to be flooded. In one such embodiment, these final pixel positions are indicated in the form of an output flood map (which is the input flood map updated based on the flood-fill process carried out by the flood-fill hardware primitive). This so-called updated or output flood map can be provided by the flood-fill hardware primitive back to the flood-fill algorithm that called that flood-fill hardware primitive, so that actual flooding of the N×M image block can be carried out by the flooding algorithm, in accordance with the updated/output flood map.

Thus, there can be one or more instantiations of the hardware primitive, and one or more processing elements that access the hardware primitives. The control processor and processing elements can be implemented with conventional processor technology, such as central processing units (CPUs) and/or purpose-built processors configured for directing flood-fill as described herein (any suitable processor technology suitable for executing functions as provided herein can be used). A hardware primitive is a fixed-function piece of hardware designed to implement a specific task. It can be duplicated to allow execution of multiple such tasks in parallel, such as for flooding the same seed, or flooding multiple seeds, or a combination (e.g., multiple tasks flood one seed, and other tasks flood a second seed). Using flood-fill hardware primitives and a software interface in accordance with an embodiment of the present invention allows for an implementation of a flood-fill process using both data-based and task-based parallelism. As will be further appreciated in light of this disclosure, the flood-fill algorithm and how much it needs to flood may be left open to the software developer. For instance, the techniques provided herein allow a developer the ability to use the hardware primitive to find the area to be flooded and then return back to software to make a judgment depending on what the developer may feel to be optimum and/or required for the application at hand. The techniques also provide the developer the ability to continue or terminate the flooding process to subsequent neighboring image blocks, as required by a given application.

Note that the number of hardware primitives need not match the number of processing elements. In such cases, the optional arbiter, which can be implemented with conventional technology (e.g., hardware and/or software), can be used in the case where multiple processing elements are trying to access, for example, a smaller set of the flood-fill hardware primitive(s). In such cases, it may be advantageous to have an arbitration policy such as FIFO-based or priority-based or round-robin-based or weighted-based policy (or any other suitable arbitration scheme), so that commands/requests from the processing element(s) to the flood-fill hardware primitive(s) can be queued and acted upon in a timely or otherwise desired fashion. Note, however, that other embodiments may have the same number of processing element(s) as flood-fill hardware primitive(s) so as to provide a 1:1 ratio, thereby eliminating the need for arbitration. In operation with respect to the example of FIG. 1, the arbiter issues tasks (by way of messages comprising an input flood map) to the flood-fill hardware primitive(s). The called flood-fill hardware primitive operates to update the given flood map, and provides pertinent return data (including the updated/output flood map) back to the calling processing element. In one example case, as can be viewed from the pseudo code provided herein as well as the block diagram and flow chart of FIGS. 1 and 5, respectively, numerous child processes can be created, each for processing flood-fill on a single image block. Assuming a limited number of flood-fill hardware primitive(s), the arbiter can be used to receive the requests and to effectively issue those requests to the flood-fill hardware primitive(s) (e.g., naturally in first-in first-out order). As can be further seen with reference to FIG. 1, a message to each flood-fill hardware primitive(s) includes the target image block pixel mask (flood map) indicating which pixels can be filled as well as the surrounding block connection points possible into the target image block. The input flood map of the message can be indicated, for instance, with logic that can be readily received, analyzed and updated by the flood-fill hardware primitive(s), so that the output flood map can be provided back to the flood fill algorithm executing on the processing element that called the hardware primitive.

The flood-fill hardware primitive entity can be configured, for example, to perform flood-fill on an M×N image block, where M is the number of pixels in the latitudinal direction (or along the x-axis) and M is the number of pixels in the longitudinal direction (or along the y-axis). In some embodiments, for instance, each flood-fill hardware primitive receives an input pixel flood map, in which pixel positions of a given target image block to be flooded are set and pixels of that block not to be flooded are reset, so as to generate an output flood map. In addition to the input flood map, the flood-fill hardware primitive also receives the surrounding pixels which represent the connectivity to this block. For ease of reference, these additional surrounding pixels may be referred to as being part of the input pixel flood map (as well as the output pixel flood map). To this end, a flood map as described herein may include both a flood region and a connectivity region.

Figure 2:
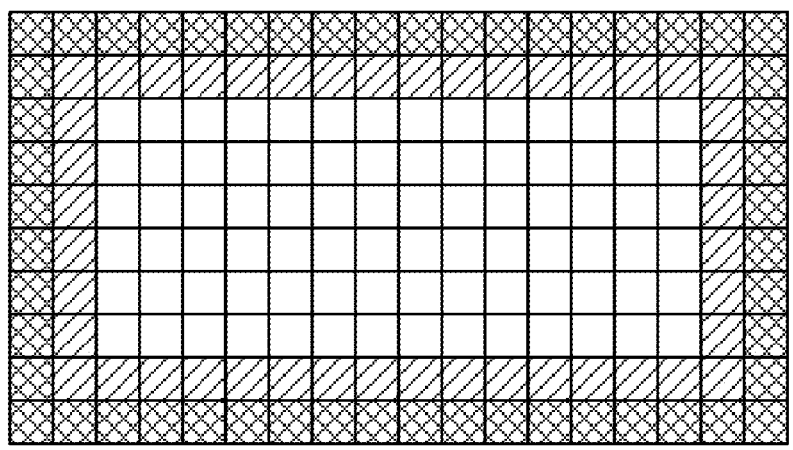
FIG. 2 illustrates an example input/output image block pixel flood map that can be used by a hardware primitive of the system shown in FIG. 1, in accordance with an embodiment of the present invention.

An example input/output pixel flood map is shown in FIG. 2, wherein the pixels inside the perimeter defined by the double-hashed boxes represent a target M×N image block. Note that the target image block depicted includes the inner line of single-hashed boxes and blank boxes, but excludes the outer line of double-hashed boxes. The double-hashed boxes effectively define connectivity to the target image block. Further note that each box depicted in FIG. 2 may be viewed as a pixel. The single-diagonal boxes of the target image block border represent the flood propagation pixels to neighbor blocks. In this specific example embodiment, the target image block being processed is 16×8 pixels (M=16, N=8). Each pixel is also associated with a width and a height (or other primary dimensions such as a diameter or a corner-to-corner diagonal), thereby providing the image block with an overall width and height. In some embodiments, all the pixels have the same geometry; but in other embodiments, some pixels may have a first geometry and other pixels may have a second geometry. Any number of pixel and/or image block geometries can be used, as will be appreciated in light of this disclosure, and the techniques provided herein can operated on any given image block. In any such cases, the flood map can be used to effectively define both the input and output of the flood-fill and propagation.

For instance, and with reference to the example embodiment shown in FIG. 2, the input to flood-fill is represented by the single-hashed boxes and blank boxes, and input for propagation to other blocks is represented by the double-hashed boxes only. This input flood map can be provided to the flood-fill hardware primitives (hence, 'input' flood map). After a flood-fill hardware primitive is run, an updated or output pixel flood map is provided (hence, 'output' or 'updated' flood map), which can effectively be represented by updated single-hashed boxes and blank boxes, and output for propagation to other blocks is represented by updated single-hashed boxes only. The updated/output flood map generated by the flood-fill hardware primitive can then be used by the flooding algorithm running on the processing element that called the flood-fill hardware primitive. In this sense, the flooding algorithm does the actual flooding.

As will be further appreciated, the input pixel flood map can be generated using any number of techniques and will generally depend on the given application, and may vary from one embodiment to the next with respect to factors such as size and shape of image block. To this end, the flood-fill hardware primitive(s) can be configured to work with any algorithm that generates an input pixel flood map, which is sent to the hardware primitive(s) to generate or otherwise define the final pixel positions to be flooded within that input flood map, thereby effectively creating the updated/output flood map.

In accordance with one example embodiment, the flood-fill hardware primitive is activated on a given image block as a thread that has the following interface:

Definition of the value to flood (e.g., specific color).
Definition of the image block: (x, y) and (width, height).
Input Flood Propagation Pixels: 1-line rectangle (or other shape) of pixels surrounding the perimeter of the image block, as indicated by the double-hashed boxes in the example of FIG. 2.
Output Flood Propagation Pixels: 1-line rectangle (or other shape) of pixels within and at the perimeter of the image block, as indicated by the single-hashed boxes in the example of FIG. 2, which serve as flood propagation pixels for neighboring image blocks. Also output is the region within the single-hashed boxes which indicates the results of the flood-fill on the image block.
Flood Map (or Flood Mask or Bit Mask or Mask Matrix): represents the desired pixels to be filled. The mask comprises a bit map representing which pixels of the image block are to be filled within the double-hashed boundary (such as shown in the example of FIG. 2).
Con8: represents whether the flood-fill is to be done using 8-connected or 4-connected.
Loop Count: represents the maximum number of iterations to perform on the image block. This count can be derived from or otherwise based on, for example, the image block size. In some such embodiments, the hardware primitive will early exit if flooding will make no change.

In operation, and in accordance with one example embodiment of the present invention, each instance of the flood-fill hardware primitive floods the desired seed node in four passes, including two vertical passes and two horizontal passes. The flood-fill hardware primitive can be configured to refer to neighbors in both 4-connected and 8-connected flood-fill schemes. For ease of description, 8-connected neighbors is assumed herein, but the disclosed techniques and architecture can readily be applied to 4-connected neighbors as well, as will be apparent in light of this disclosure. As is known, so-called 4-connected flood-fill schemes refer to the four neighboring pixels directly adjacent a given pixel (pixel at left side, pixel at right side, pixel at top side, and pixel at bottom side), and so-called 8-connected flood-fill schemes refer to those same four directly adjacent neighboring pixels in addition to pixels that are diagonally adjacent that given pixel (pixel at upper left corner, pixel at upper right corner, pixel at lower left corner, and pixel at lower right corner).

FIG. 3a illustrates a first pass (left to right) of the flood-fill hardware primitive when flooding a desired seed node, in accordance with one embodiment. Note that, in the various examples provided herein, a given pixel may be referred to by its coordinates within the pixel block (which can be thought of as an array or matrix of rows and columns of pixels). For instance, pixel C22 represents the pixel in column C and row 22. In this first pass shown in FIG. 3a, each pixel gets the flooded value if any of the pixels to its left column (assuming 8-connected) is flooded, and the pixel is not masked off by the flood map (indicated by 'Valid' in the depicted table). For example, pixel C22 will be set as in FIG. 3a if any of its neighbors to the left is set, and it is not masked off in the mask matrix. Assuming 8-connected, these neighbors to the left include B22 (which is directly adjacent to C22) and B21 and B23 (which are diagonally adjacent to C22). In this example, note that C22 is initialized to 0 by the hardware primitive before initiating the flood-fill. FIG. 3b illustrates a second pass (top to bottom) of the flood-fill hardware primitive when flooding the given seed node, in accordance with one embodiment. In this second pass, each pixel gets the flooded value if any of the pixels to its upper row is flooded, and the pixel is not masked off by the flood map. Continuing with the example in FIG. 3a, pixel C22 will be set if any neighbor to its top is set, and it is not masked off in the mask matrix. Assuming 8-connected, these top neighbors include B22 (which is directly adjacent to C22) and B21 and D21 (which are diagonally adjacent to C22). FIG. 3c illustrates a third pass (right to left) of the flood-fill hardware primitive when flooding the given seed node, in accordance with one embodiment. In this third pass, each pixel gets the flooded value if any of the pixels to its right column is flooded, and the pixel is not masked off by the flood map. Continuing with the example in FIGS. 3a-b, pixel C22 will be set if any of the neighbors to the right is set, and it is not masked off in the mask matrix. Assuming 8-connected, these neighbors to the right include D22 (which is directly adjacent to C22) and D21 and D23 (which are diagonally adjacent to C22). FIG. 3d illustrates a fourth pass (bottom to top) of the flood-fill hardware primitive when flooding the given seed node, in accordance with one embodiment. In this fourth pass, each pixel gets the flooded value if any of the pixels to its bottom row is flooded, and the pixel is not masked off by the flood map. Continuing with the example in FIG. 3a-c, pixel C22 will be set if any of the neighbors to the bottom is set, and it is not masked off in the mask matrix. Assuming 8-connected, these neighbors to the bottom include C23 (which is directly adjacent to C22) and B23 and D23 (which are diagonally adjacent to C22). These four passes executed by a flood-fill hardware primitive can be repeated one or more times depending on the size of the image block and the desired accuracy of the flooding. In some embodiments, the flood-fill hardware primitive is configured to early exit the flood map updating procedure if it detects that flooding will make no change (e.g., updated flood map will be same as the input flood map, or otherwise within a given tolerance that indicates a negligible difference with the input flood map). The proposed implementation enables parallel progress and concurrent propagation.

The latency of four passes is invariant to the content and corresponds to (N+M)*2 where N and M are the image block dimensions. As will be appreciated in light of this disclosure, compared to a naïve approach that floods the seed in one pass, an approach configured in accordance with an embodiment is favorable in both gate-count and latency. In contrast, a single-pass approach is highly serial and requires a pixel-by-pixel iterative operation, whereas an approach in accordance with such an embodiment can be performed on a row or column, such that pixels of that row or column are simultaneously processed. The serial approach entails more latency to complete and is gate count intensive, so the performance also drops, though the serial approach may require fewer passes to complete depending on the pattern.

An example embodiment of flood-fill hardware primitive is presented below in pseudo code and can be used, for instance, to reduce latency and semiconductor die area, and to improve performance for most cases. As will be appreciated, the pseudo code is a C-like example for the method described with respect to the example embodiment represented in FIGS. 3a-d applied to an M×N image block. This pseudo code can be implemented, for example, in hardware such as gate level logic or purpose-built semiconductor, such as one or more field programmable gate arrays (FPGAs) and/or application-specific integrated circuits (ASICs). Alternatively, the pseudo code can be implemented in software and/or firmware executing on one or more processors. In some embodiments, one or more flood-fill hardware primitives are implemented in conjunction with one or more software-based flood-fill routines. In a more general sense, any combination of hardware, software, and/or firmware can be used. As will further be appreciated in light of this disclosure, the operations reflected in the code can be very efficiently implemented on a hardware primitive that natively supports vector processing, in accordance with some specific example embodiments.

```
// mask[ ][ ] is the (M+2)×(N+2) pixel mask received.
// matrix[ ][ ] is the M×N working region of pixel mask.
//Initialize
Flood_x = M
Flood_y = N
For(j=0; j<N+2; j++)
  For(i=0;i<M+2;i++){
    If((i==0) || (i==M+1) || (j==0) || (j==N+1))
      matrix[j][i] = mask[j][i]
    else
      matrix[j][i] = 0;
    PrevMatrix[j][i] = matrix[j][i]
  }
For(loopCnt = 0; loopCnt < LOOP_COUNT; loopCnt++){
  // First pass : Left to Right
  For(i=1; i<= flood_x; i++)
    For(j=1; j<= flood_y; j++)
      matrix[j][i] = (mask[j][i] & (matrix[j][i-1] | con8 &
        (matrix[j-1] [i-1] |
        matrix[j+1][i-1]))) | matrix[j][i]
  // Second pass : Top to Bottom
  For(j=1; j<= flood_y; j++)
    For(i=1; i<= flood_x; i++)
      matrix[j][i] = (mask[j][i] & (matrix[j-1][i] | con8 &
        (matrix[j-1] [i-1] |
        matrix[j-1][i+1]))) | matrix[j][i]
  // Third pass : Right to Left
  For(i=flood_x; i>= 1; i--)
    For(j=flood_y; j>= 1; j--)
      matrix[j][i] = (mask[j][i] & (matrix[j][i+1] | con8 &
        (matrix[j-1] [i+1] |
        matrix[j+1][i+1]))) | matrix[j][i]
  // Fourth pass : Bottom to Top
  For(j=flood_y; j>= 1; j--)
    For(i=flood_x; i>= 1; i--)
      matrix[j][i] = (mask[j][i] & (matrix[j+1][i] | con8 &
        (matrix[j+1] [i-1] |
        matrix[j+1][i+1]))) | matrix[j][i]
  Match = 1
  For(j=1; j<= flood_y; j++)
    For(i=1; i<= flood_x; i++){
      If(PrevMatrix[j][i] != matrix[j][i]) Match = 0;
      PrevMatrix[j][i] = matrix[j][i]
    }
  If(Match == 1) return(matrix[ ][ ]);
}
Return(matrix[ ][ ]);
```

This example pseudo code represents 8-connectivity. The flood-fill with 4-connectivity can be done by looking at the connected pixel to be only B22, C21, D22, C23 respectively for the four passes previously described. So, for example, the equations for 4-connectivity can be represented as:

C22=C22 OR (B22 AND valid_C22); /left to right, as shown in FIG. 3a/

C22=C22 OR (C21 AND valid_C22); /top to bottom, as shown in FIG. 3b/

C22=C22 OR (D22 AND valid_C22); /right to left, as shown in FIG. 3c/

C22=C22 OR (C23 AND valid_C22); /bottom to top, as shown in FIG. 3d/

Also, note that the order of the four passes can be interchanged. In particular, and in accordance with some embodiments, note that interleaving horizontal and vertical passes produces superior results in most cases, with respect to both 4-connectivity and 8-connectivity. Thus, a flood-fill hardware primitive configured in accordance with one example embodiment of the present invention is implemented to alternate from a left-to-right pass or a right-to-left pass to one of a top-to-bottom pass or a bottom-to-top pass. Any such alternating combination of horizontal-to-vertical, or vertical-to-horizontal can be used, as will be appreciated. Other embodiments, however, may execute the horizontal passes first, and then proceed with the vertical passes (or vice-versa).

The software interface can be implemented in a number of ways as well. In one example embodiment, the software interface is configured with the following interface definition: flood-fill(Matrix<M×N>FloodRegion, Matrix <M+2× N+2>FloodMask, bool con8, int LOOP_COUNT); where:

FloodMask: (M+2)×(N+2) input bit mask, which contains the M×N region to be flooded and the surrounding connection points (as shown in the example of FIG. 2).

LOOP_COUNT: Controls the number of iterations the flood-fill operation is performed.

Con8: True=8-connected and False=4-connected, used for the flood-fill operation.

FloodRegion: M×N output bit mask of the region to be flooded (single-hashed and blank boxes in the example of FIG. 2).

The following provides an example specific usage of the system shown in FIG. 1, in accordance with an embodiment of the present invention. In order to perform flood-fill of a certain seed on an image, the initial or input flood map is first defined. In one such embodiment, a software control module can be programmed or otherwise configured to prepare the input flood map per seed per image block, the input flood map indicating which pixels in the image block can accept the flooded value as previously explained. The software control module can also be used, for example, to forward to each hardware primitive the flood connection points as were produced by previously processed neighbor image blocks. All these operations can be carried out in a bitwise fashion with no conditions and if statements, thereby allowing them to use a low number of bits and to be power/performance efficient. An example pseudo-code for a software control module configured in accordance with an embodiment of the present invention will be provided in turn.

Figure 4:
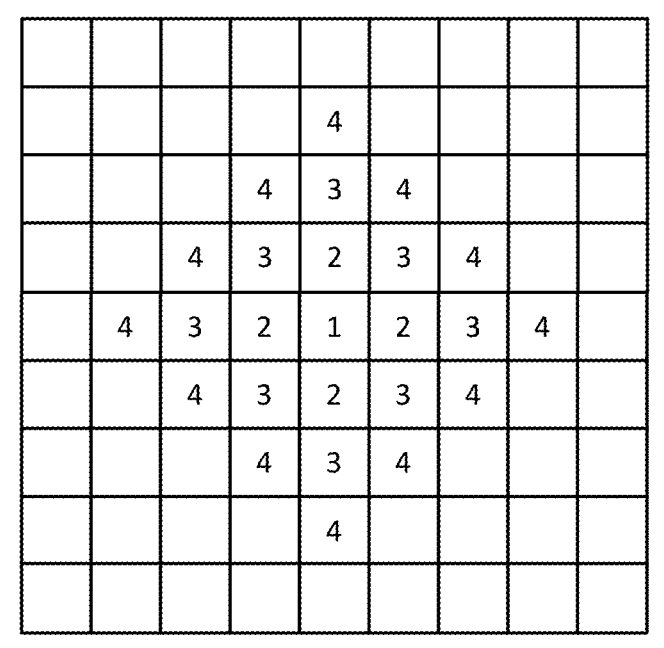

Different algorithms can be used to set the initial bit mask according to the conditions of the flooding. Conditions can be, for instance, differences in the RGB values, differences in the luminance values, depth values, etc. Once the initial bit map (or flood map or flood mask) is set, flood-fill can be performed (including updating of the flood map as described herein, and the subsequent actual flood-fill). As shown in the example of FIG. 4, flood-fill can be initiated by calling the software interface and providing an M×N image block that contains the seed point (marked in FIG. 4 as 1). When the first image block is done, flood-fill can be concurrently performed on its four M×N neighbor image blocks (these blocks are marked in FIG. 4 as 2). In the next stage, all following neighbor blocks can be concurrently processed (these blocks are marked in FIG. 4 as 3), and flood-fill continues in a wave front fashion (next wave of blocks are marked in FIG. 4 as 4, and so on). This way, the number of blocks that can run in parallel grows rapidly. In some embodiments, each processing element flood routine can be further programmed or otherwise configured to early exit processing a given image block if, for example, all its connection points are reset or if its updated mask is completely reset. Thus, for different seed points within a given stage of processing, flood-fill can concurrently be applied on independent image blocks or regions of that particular stage, in accordance with an embodiment of the present invention.

An example software control module pseudo-code that presents calling the software interface to flood a seed starting from (x,y) using blocks of M×N in accordance with an example embodiment is provided here. For this example embodiment, assume that the image block size is (K*M)×(T*N):

```
// matrix valid[K][L] indicates block status: 0: not ready, 1: ready,
2: processed, 3: Done
//Initialize
for (k=0; k<K; k++)
  for (t=0; t<T; t++)
```

```
    Valid[k][t] = NOT_READY // No block is ready to be processed
  k = (x - (x%M) / M) // k and t indicate the indexes of the M×N block
  t = (y - (y%N) / N) // that holds (x,y) pixel
  Valid[k][t] = READY;
While ( ! Done )
  Done = TRUE;
  for (k=0; k<K; k++)
    for (t=0; t<T; t++)
    {
      if ( (Valid[k][t] == NOT_READY) || (Valid[k][t] == PRO-
CESSED))
        Done = FALSE;
      if ( Valid[k][t] == READY) {
        Done = FALSE;
        pid = fork( );
        If ( pid == 0 ) { // child process
          Valid[k][t] = PROCESSED
          flood-fill( Image, k*M, t*M, Mask, LOOP_COUNT );
          Valid[k][t] = DONE
          If ( Valid[k-1][t] == NOT_READY ) Valid[k-1][t] == READY;
          If ( Valid[k+1][t] == NOT_READY ) Valid[k+1][t] == READY;
          If ( Valid[k][t-1] == NOT_READY ) Valid[k][t-1] == READY;
          If ( Valid[k][t+1] == NOT_READY ) Valid[k][t+1] == READY;
        } // pid == 0
      } // If block is READY
    } // for t
} // while
```

Methodology

Figure 5:
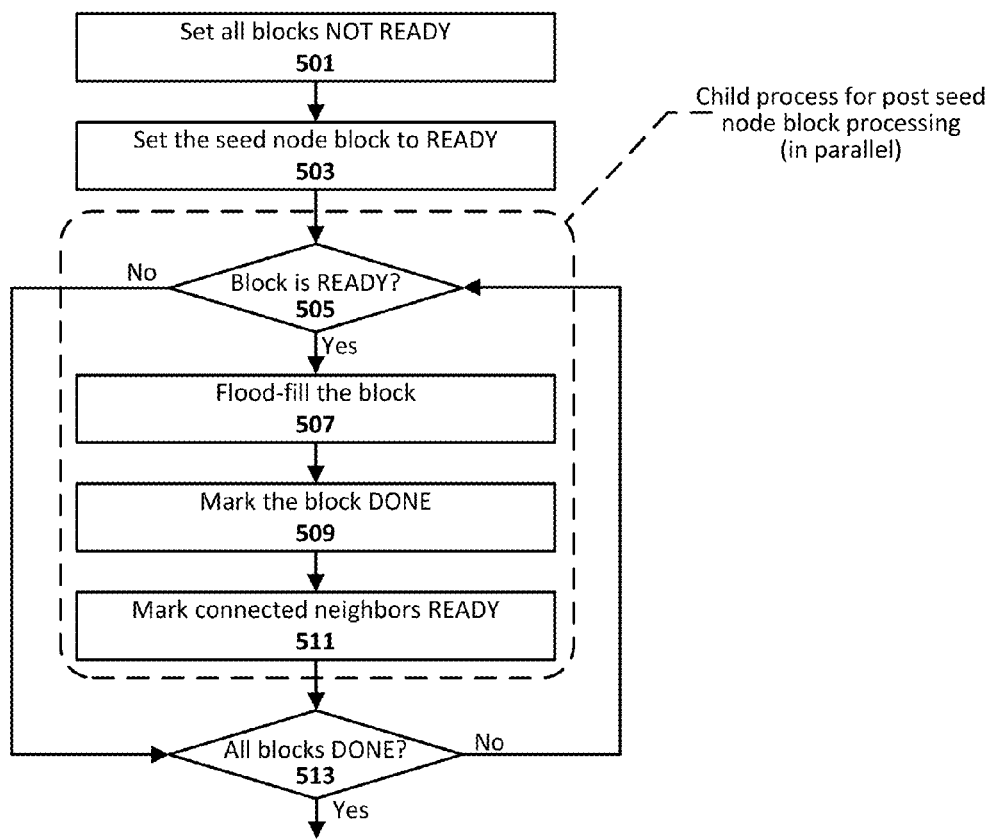
FIG. 5 illustrates a flowchart that demonstrates how the software interface of the system shown in FIG. 1 can produce parallel threads and issue them to processing elements, such that each of them can run independently until done, in accordance with an embodiment of the present invention.

FIG. 5 illustrates a flowchart that demonstrates how the software interface of the system shown in FIG. 1 can produce parallel threads and issue them to processing elements, such that each of them can run independently until done, in accordance with an embodiment of the present invention. In general, the process can start with an image block that holds point (x,y), of the so-called seed node. Once that block is processed, the process can continue to all its neighbor blocks, and so on. Parallel processing can be used at each subsequent image block stage of processing, as discussed with reference to FIG. 4, in accordance with some such embodiments.

In operation, all image blocks except for the one that holds (x,y) (i.e., the seed node) are effectively set to NOT READY. When a given READY image block is processed, each of its neighbors are then set to READY so as to set up a next stage of processing. Each READY image block that is processed is marked as DONE, so as to avoid infinite loops. When all image blocks are DONE, the process stops. Note that in each step after the seed node image block is processed, multiple READY image blocks can be processed in parallel. The number of blocks that can be processed in parallel depends on the number of flood-fill hardware primitives in use, as previously explained.

As can be seen with reference to the example embodiment of FIG. 5, the process begins by setting 501 the initial values of all image blocks to NOT READY, and setting 503 the image block having the seed node to READY. The not DONE image blocks can then be processed, beginning with the seed node image block and then continuing with the remaining image blocks in a wave-like fashion as discussed with reference to FIG. 4, wherein neighboring image blocks of processed blocks of one stage are designated for processing in the next stage of the flood-fill operation. Thus, and as further can be seen with further reference to the example embodiment of FIG. 5, after the seed node image block is processed, the remaining image blocks can be processed in parallel as one or more stages using a number of identical child processes, which in this example embodiment include sub-processes 505 through 511, until all blocks of that stage are processed. The next stage of blocks (if any) can then be processed.

In particular, the example process of FIG. 5 continues with determining 505 if a given image block is READY. If so, then the process continues with flood-filling 507 that image block, which can be accomplished using a four pass flood-fill such as discussed with reference to FIGS. 3a-d. The process then continues with marking 509 the flood-filled image block DONE, and marking 511 each of its connected neighbors as READY. The connected neighbors marked READY will depend for example, on whether a 4-connected or an 8-connected flood-fill scheme is employed, in accordance with some embodiments. If 4-connected, then marking 511 includes marking the four directly adjacent image blocks as READY, as previously explained. If 8-connected, then marking 511 includes marking the four directly adjacent image blocks as well as the four diagonally adjacent image blocks as READY. Thus, in the seed node stage, only the seed node image block is processed, but in each subsequent stage, 4 or 8 images blocks can be processed in parallel, in accordance with some embodiments.

The process continues with determining if all image blocks are DONE. If not, the process continues with determining 505 if the next image block is READY, and the sub-processes 507 through 513 (or just 513, depending on the outcome of the determination at 505) generally repeat for each image block being processed. As can be further seen in this example embodiment, if the determination at 505 indicates that the target image block is not READY, then the process may continue with determining 513 if all image blocks have been processed. If not, the process continues with determining 505 if the next image block is READY, and the process generally repeats. Numerous variations on the process will be apparent in light of this disclosure.

As will be further appreciated in light of this disclosure, the various functional modules described herein can be implemented, for example, in any suitable programming language (e.g., C, C++, objective C, custom or proprietary instruction sets, etc), and encoded on one or more machine readable mediums, that when executed by one or more processors, carry out flood-fill functionality as described herein. Other embodiments can be implemented, for instance, with gate-level logic (e.g., FPGA) or an ASIC or chip set or other such purpose built logic, or a microcontroller having input/output capability (e.g., inputs for receiving user inputs and outputs for directing other components) and a number of embedded routines for carrying out flood-fill functionality. In short, the functional modules can be implemented in hardware, software, firmware, or a combination thereof, and any such variation may be used in conjunction with one or more flood-fill hardware primitives.

Example System

Figure 6:
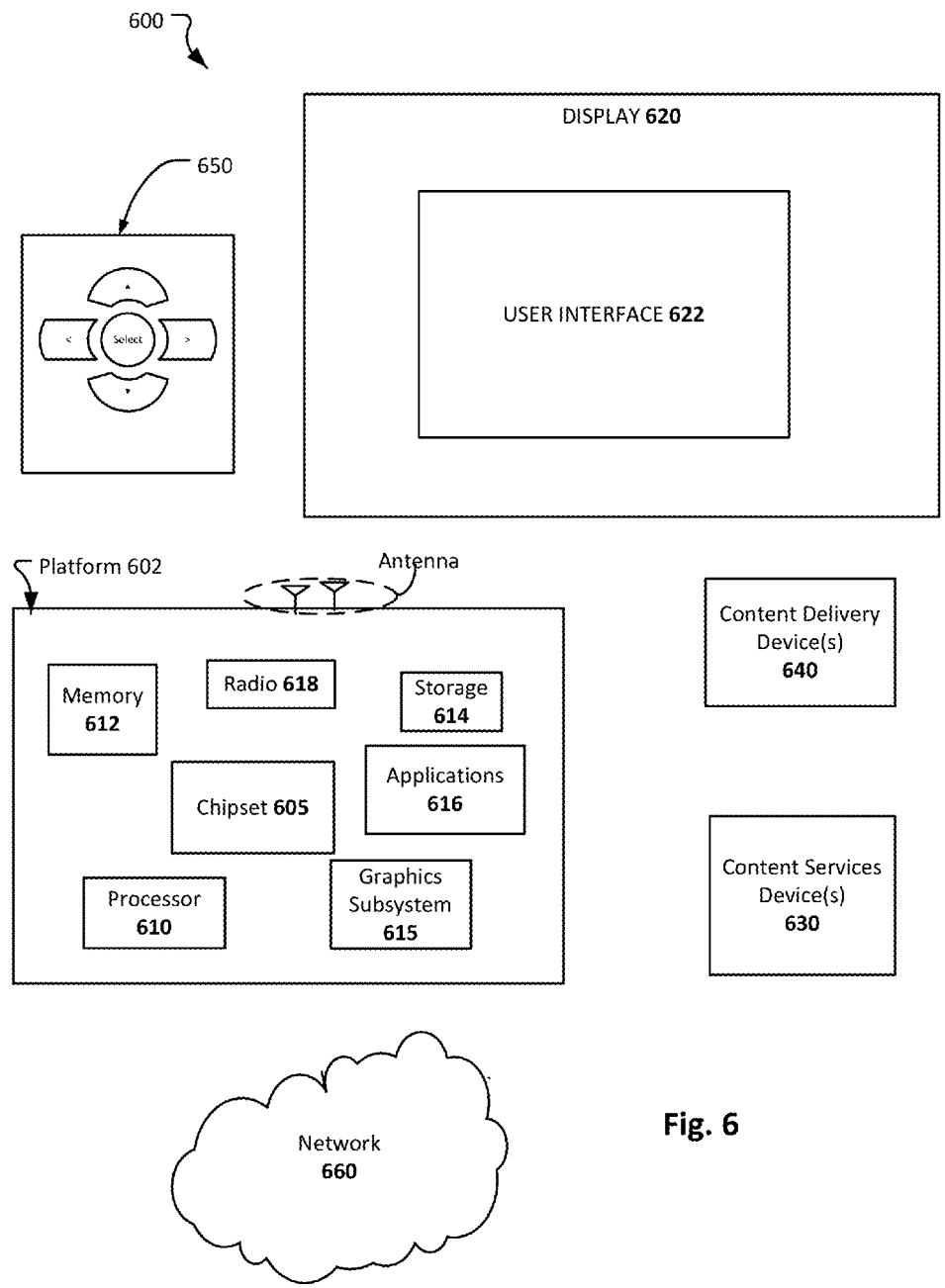
FIG. 6 illustrates a media system configured in accordance with an embodiment of the present invention.

FIG. 6 illustrates an example system 600 that may execute a flood-fill operation as described herein, in accordance with some embodiments. In some embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing flood-fill operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques described herein (including flood-fill, etc) may be implemented in various hardware architectures. For example, flood-fill functionality may be integrated within a graphics and/or video chipset. Alternatively, a discrete flood-fill processor may be used. In still another embodiment, the graphics and/or video functions including flood-fill may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Display 620 may comprise, for example, a liquid crystal display (LCD) screen, electrophoretic display (EPD or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the claimed invention. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the claimed invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using flood-fill techniques as described herein). The embodiments, however, are not limited to the elements or context shown or described in FIG. 6.

Figure 7:
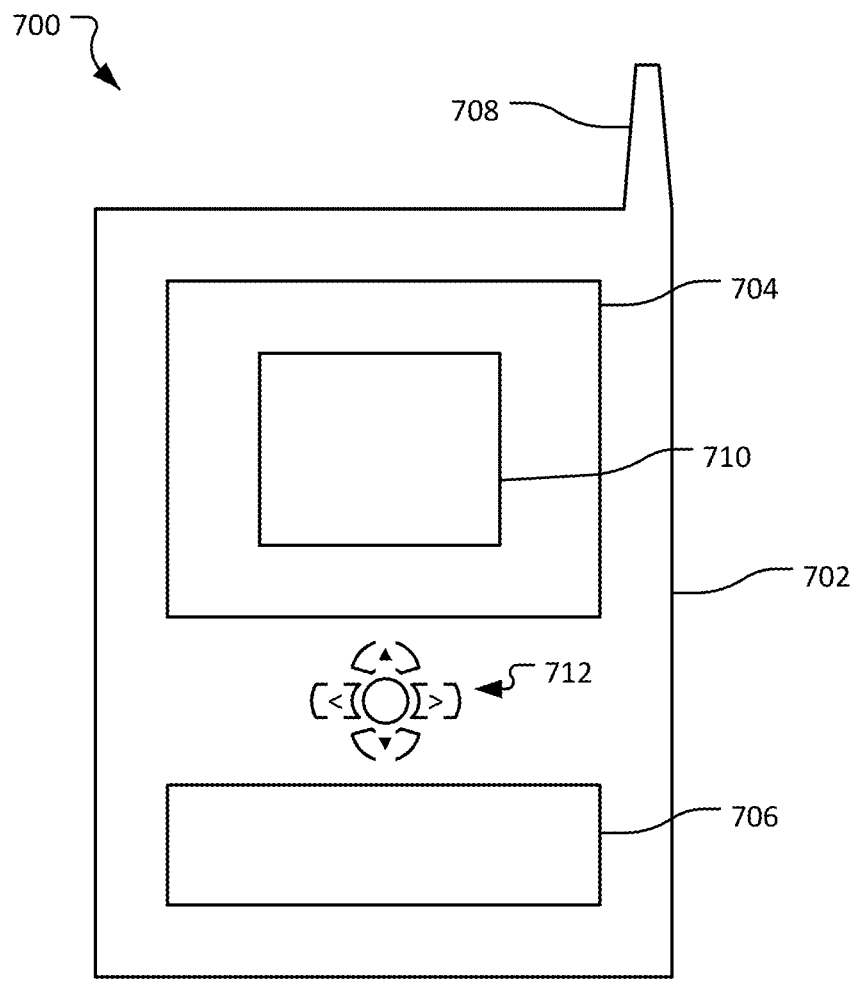
FIG. 7 illustrates a mobile computing system configured in accordance with an embodiment of the present invention.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous embodiments will be apparent, and features described herein can be combined in any number of configurations. One example embodiment of the present invention provides a device that includes a processing element configured to execute a flood fill routine in accordance with an updated flood map, and a software interface configured to direct the processing element to issue an input flood map for a given image block to be flood-fill processed. The device further includes a flood-fill hardware primitive configured to receive and update the input flood map to include final pixel positions to be flooded, and to provide the updated flood map to the processing element. In some cases, the device includes multiple processing elements, and the device further includes an arbiter operatively coupled between the processing elements and the flood-fill hardware primitive, so that processing element commands to the flood-fill hardware primitive can be acted upon pursuant to an arbitration scheme. In some such cases, the device further includes multiple flood-fill hardware primitives which are used in accordance with the arbitration scheme. In some cases, the input flood map indicates pixels in the image block that can accept a flooded value. In some such cases, the input flood map further indicates surrounding pixels of the image block which represent connectivity to the image block. In some cases, the device is configured to initially flood-fill an image block that includes a seed node, and to subsequently flood-fill neighbor image blocks of that seed node image block. In some cases, the software interface is configured to produce parallel threads and issue each one to one of multiple processing elements, such that each thread can run independently until done. In some cases, the flood-fill hardware primitive is implemented with a bitwise definition. In some such cases, the bitwise definition is tuned to meet at least one of power and processor cycle performance targets. In some cases, the processing element is configured to early exit the flood fill routine if all connection points of the given image block are reset or if its updated flood map is completely reset. In some cases, the flood-fill hardware primitive is configured to early exit flood map updating if it detects that flooding will make no change (e.g., updated flood map will be same as input flood map, or otherwise within a given tolerance that indicates a negligible difference with the input flood map). Numerous variations will be apparent. For instance, another embodiment provides a media processing system that includes a device as variously defined in this paragraph. Another example embodiment provides a mobile computing system that includes the media processing system.

Another example embodiment of the present invention provides a media processing system. The system includes a plurality of processing elements each configured to execute a flood fill routine in accordance with an updated flood map, and a software interface configured to produce parallel threads and issue each one to one of the processing elements, such that each thread can run independently until done and thereby directing each of those processing elements to issue an input flood map for a given image block to be flood-fill processed. The system further includes a plurality of flood-fill hardware primitives, each configured to update an input flood map received from one of the processing elements to include final pixel positions to be flooded, and to provide the updated flood map back to that processing element. In some cases, the system further includes an arbiter operatively coupled between the processing elements and the flood-fill hardware primitives, so that processing element commands to the flood-fill hardware primitives can be acted upon pursuant to an arbitration scheme. In some cases, each input flood map indicates pixels in the corresponding image block that can accept a flooded value, and further indicates surrounding pixels of that corresponding image block which represent connectivity to that corresponding image block. In some cases, the system is configured to initially flood-fill a given image block that includes a seed node, and to subsequently flood-fill neighbor image blocks of that seed node image block. In some cases, the flood-fill hardware primitive is implemented with a bitwise definition. In some cases, the processing element is configured to early exit flood-fill processing a given image block if all connection points of that image block are reset or if its updated flood map is completely reset. In some cases, at least one of the flood-fill hardware primitives is configured to early exit flood map updating if it detects that flooding will make no change.

Another example embodiment of the present invention provides a method that includes directing, via a software interface, a processing element to issue an input flood map for a given image block to be flood-fill processed. The method further includes updating, via a flood-fill hardware primitive, the input flood map to include final pixel positions to be flooded, and providing the updated flood map back to the processing element. In some cases, the directing includes multiple processing elements, and the method further includes acting upon processing element commands to the flood-fill hardware primitive pursuant to an arbitration scheme. In some cases, the input flood map indicates pixels in the image block that can accept a flooded value, and further indicates surrounding pixels of the image block which represent connectivity to the image block. In some cases, the method comprises initially flood-filling an image block that includes a seed node, and subsequently flood-filling neighbor image blocks of that seed node image block. In some cases, directing a processing element comprises producing parallel threads and issuing each one to one of multiple processing elements, such that each thread can run independently until done. In some cases, the flood-fill hardware primitive is implemented with a bitwise definition. In some cases, directing a processing element comprises early exiting flood-fill processing the given image block if all connection points of that image block are reset or if its updated flood map is completely reset. In some cases, the method further comprises early exiting the updating if flooding will make no change.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A flood-fill device, comprising:
   a flood-fill hardware primitive configured to receive and update an input flood map for a given image block to be flood-fill processed to include final pixel positions to be flooded thereby providing an updated flood map, wherein each of the input flood map and the updated flood map comprises a bit map representing which pixels of the image block are to be flooded and which pixels are not to be flooded, and the flood-fill hardware primitive is implemented with a bitwise definition; and
   a processing element configured to execute a flood fill routine in accordance with the updated flood map.

2. The device of claim 1 wherein the processing element is one of multiple processing elements, the device further comprising:
   an arbiter operatively coupled between the processing elements and the flood-fill hardware primitive, so that processing element commands to the flood-fill hardware primitive can be acted upon pursuant to an arbitration scheme.

3. The device of claim 2 wherein the device further includes multiple flood-fill hardware primitives which are used in accordance with the arbitration scheme.

4. The device of claim 1 wherein the input flood map further indicates surrounding pixels of the image block which represent connectivity to the image block.

5. The device of claim 1 wherein the device is configured to initially flood-fill an image block that includes a seed node, and to subsequently flood-fill neighbor image blocks of that seed node image block.

6. The device of claim 1 further comprising a software interface configured to at least one of direct the processing element to issue the input flood map, and produce parallel threads and issue each one to one of multiple processing elements such that each thread can run independently until done.

7. The device of claim 1 wherein the bitwise definition is tuned to meet at least one of power and processor cycle performance targets.

8. The device of claim 1 wherein the processing element is configured to early exit the flood fill routine if all connection points of the given image block are reset or if its updated flood map is completely reset.

9. The device of claim 1 wherein the flood-fill hardware primitive is configured to early exit flood map updating if it detects that flooding will make no change.

10. A flood-fill system, comprising:
a plurality of processing elements each configured to execute a flood fill routine in accordance with a corresponding input flood map for a given image block to be flood-fill processed; and
a plurality of flood-fill hardware primitives, each configured to update one of the input flood maps to include final pixel positions to be flooded thereby providing an updated flood map, and to provide the updated flood map back to that processing element;
wherein at least one of the input flood maps and a corresponding one of the updated flood maps each indicates pixels in a corresponding image block that can accept a flooded value and pixels that cannot accept a flooded value, and at least one of the flood-fill hardware primitives is implemented with a bitwise definition.

11. The system of claim 10 further comprising:
an arbiter operatively coupled between the processing elements and the flood-fill hardware primitives, so that processing element commands to the flood-fill hardware primitives can be acted upon pursuant to an arbitration scheme.

12. The system of claim 10 wherein the at least one input flood map and the corresponding updated flood map each further indicates surrounding pixels of that corresponding image block which represent connectivity to that corresponding image block.

13. The system of claim 10 wherein the system is configured to initially flood-fill a given image block that includes a seed node, and to subsequently flood-fill neighbor image blocks of that seed node image block.

14. The system of claim 10 wherein:
at least one of the processing elements is configured to early exit flood-fill processing a given image block if all connection points of that image block are reset or if its updated flood map is completely reset; and
at least one of the flood-fill hardware primitives is configured to early exit flood map updating if it detects that flooding will make no change.

15. A flood-fill method, comprising:
updating, via a flood-fill hardware primitive, an input flood map for a given image block to be flood-fill processed to include final pixel positions to be flooded, thereby providing an updated flood map; and
providing the updated flood map back to a processing element configured to execute a flood fill routine in accordance with the updated flood map;
wherein each of the input flood map and the updated flood map comprises a bit map representing which pixels of the image block are to be flooded and which pixels are not to be flooded, and the flood-fill hardware primitive updates the input flood map in accordance with a bitwise definition.

16. The method of claim 15 further comprising at least one of:
early exiting flood-fill processing the given image block if all connection points of that image block are reset or if its updated flood map is completely reset; and
early exiting the updating if flooding will make no change.

17. A graphics card comprising the device of claim 1.

18. A media processing system comprising the device of claim 1.

19. A mobile computing system comprising the device of claim 1.

* * * * *